March 6, 1934.  M. P. E. HOHN  1,950,177
GRINDER FOR FLY CUTTERS
Filed Dec. 29, 1927   2 Sheets-Sheet 1

Fig. 2ª

Inventor
Max Paul Ernst Hohn
By
Max F. Ordmann
Atty

March 6, 1934.   M. P. E. HOHN   1,950,177
GRINDER FOR FLY CUTTERS
Filed Dec. 29, 1927   2 Sheets-Sheet 2

Patented Mar. 6, 1934

1,950,177

UNITED STATES PATENT OFFICE 1,950,177

GRINDER FOR FLY CUTTERS

Max Paul Ernst Hohn, Dresden, Germany, assignor to the firm "Universelle" Cigarettenmaschinenfabrik J. C. Muller & Co., Dresden, Germany Application December 29, 1927, Serial No. 243,400
In Germany January 10, 1927

9 Claims. (Cl. 51—248)

For grinding the fly cutter of cigarette rod making machines there have already been proposed arrangements in which during the operation of the cigarette making machine the grinding means moves into engagement with the cutting edge of the fly cutter after each cutting operation.

In accordance with the present invention contact of the cutting edge by the grinding means is effected during the engagement of these two parts in a satisfactory manner and by simple means, without resort to complicated controlling means, the grinding means being structurally completely separate from the means for operating the fly cutter.

The invention consists primarily in the feature that the grinding means is moved in a circular path in a plane at right angles or approximately right angles to the plane in which the fly cutter moves, so that in describing the said circular path the grinding means comes once into contact with the cutting edge of the fly cutter in such manner that in consequence of the speed of rotation of the grinding means the latter remains in engagement with the cutting edge of the fly cutter.

Preferably, two, four or more grinding devices are mounted at equal distances apart on a disc-like or star-shaped support, which grinding devices in describing their circular path come in succession into engagement with the rapidly rotating fly cutter.

The support for the grinding means is adjustable as a whole in the direction towards the axis of rotation of the fly cutter support and is adapted to be secured in its position of adjustment; the grinding devices being radially adjustable on the support therefor.

In particular, with fly cutters which do not rotate in one plane but describe a helical or similar path so that they follow the feeding movement of the rod with the speed of the rod without displacement of the cutter support during the cutting operation, the holder for the grinding means is rotatable about an axis parallel or approximately parallel to the plane of rotation of the fly cutter, which axis describes the circular path, the holder being turned about its axis of rotation during the engagement of the grinding means and the fly cutter by means of suitable controlling mechanism in order that the grinding means may remain in engagement with the cutting edge of the fly cutter.

Suitably the axis of rotation of the holder for the grinding means is presented by a continuously rotating disc or star-shaped support, while a prolongation of the holder for the grinding means bears with its follower-carrying end against a stationary cam.

Two embodiments of the invention are illustrated in the accompanying drawings which form part of this specification and in which similar reference characters denote corresponding parts. In the drawings, Fig. 1 is a side elevation partly in section of one form of my grinding means as applied to a fly cutter;

Fig. 2A is a view of the cutter and its support;

Figure 1:
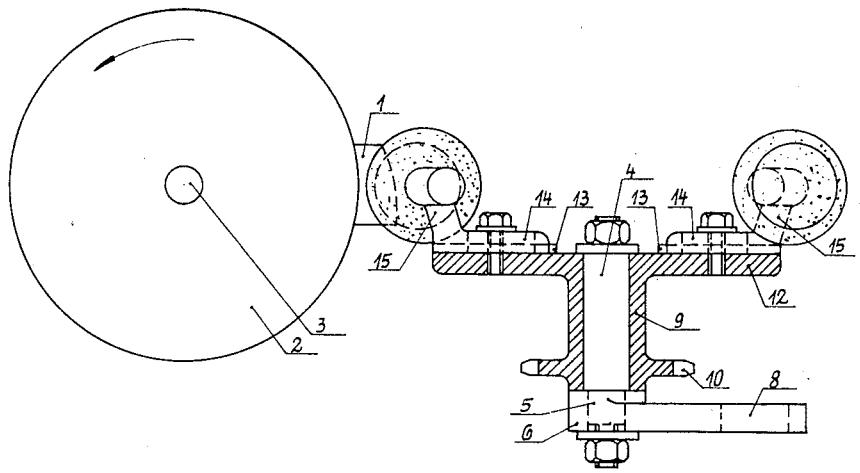
Figure 2:
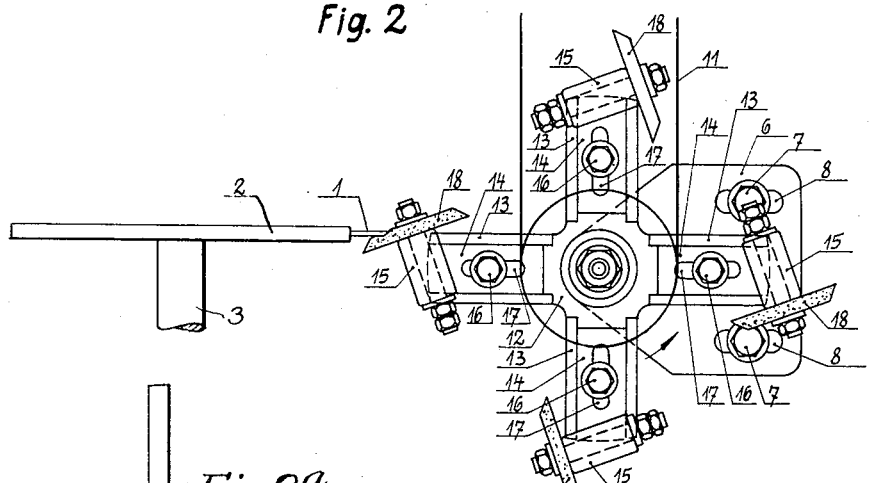
Fig. 2 is a top plan view thereof.
Figure 2:
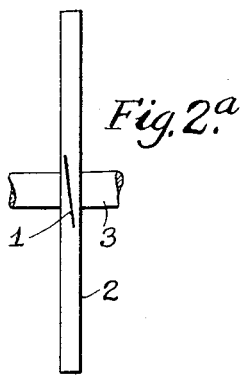

Referring to the embodiment illustrated in Figs. 1 and 2, the fly cutter 1 is secured to a disc-like support 2 which is mounted on a shaft 3 and rotates in the direction of the arrow.

The support for the grinding means is rotatable about a vertical spindle 4 which is mounted with the journal 5 in the bearing member 6. This bearing member is secured on a horizontal table on the frame by means of bolts 7 which extend through slots 8 in the bearing member. These slots are so directed as to permit displacement of the bearing member in the direction towards the shaft 3 of the fly cutter support.

The support for the grinding means consists of a rotatable star-shaped body the hub 9 of which embraces the upright spindle 4 and is provided at its lower end with a sprocket wheel 10 which is driven by chain 11 circulating in the direction of the arrow, see Fig. 2. The support is provided with four arms 12 angularly displaced to the extent of 90°. On each arm are provided radial guides 13 in each of which the base 14 of the holder 15 of a grinding device can slide. These grinding devices are located by means of screws 16 which extend through longitudinal slots 17 of the holder-bases 14 so that each holder for a grinding device can be radially adjusted and can be secured in the desired position of adjustment. The disc-like grinding device 18 shown in this embodiment is rotatable in relation to the holder 15 and presents its peripheral face to the fly cutter 1 since the support 9 for the grinding devices rotates in the direction of the arrow indicated in Fig. 2.

As is clear, each grinding disc 18 describes a circular path and thus comes once in contact with the fly cutter 1. The fly cutter thus moves along the peripheral face of the grinding disc 18. In consequence of the rotary movement of the grinding devices during the movement of the fly cutter past it the end face of the grinding disc remains in continuous contact with the cutting edge although this cutting edge gradually recedes as determined by the curved form of the cutter.

Figure 3:
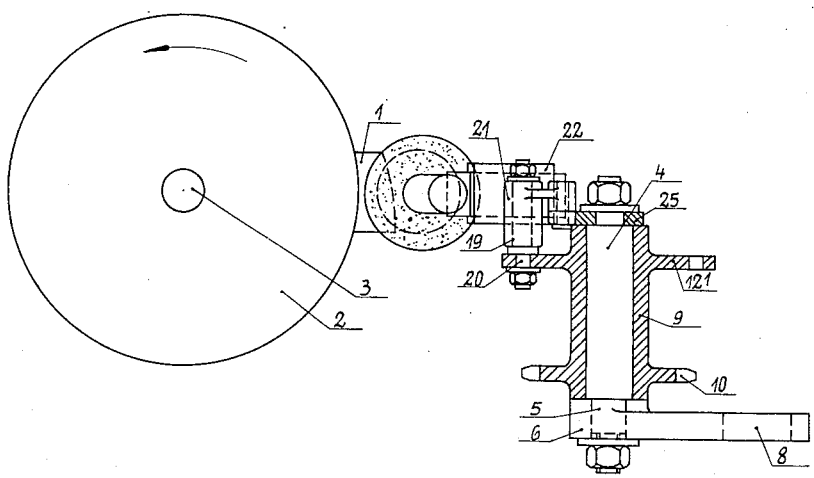
Fig. 3 is a side elevation of a modified form also partially in section.
Figure 4:
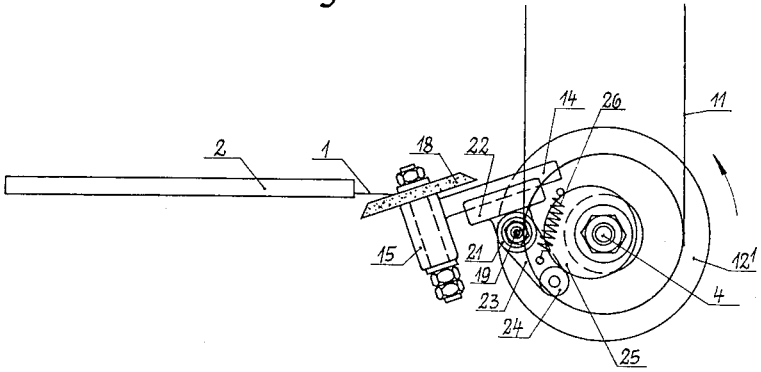
Fig. 4 is a top plan view of said modified form.

In the embodiment shown in Figs. 3 and 4 the fly cutter 1, the support 2 for the fly cutter and the cutter shaft 3 are shown as before. It is assumed in this instance that the cutter support 2 does not describe a rotary movement in one plane but makes a bodily movement so that the fly cutter not only rotates but also reciprocates in the longitudinal direction of the shaft 3 in order when cutting the cigarette rod to follow its feeding movement with the speed of such feeding movement.

In this embodiment also there is provided a bearing member 6 in which fits the journal 5 of the vertical spindle 4. On this spindle is fitted the hub 9 for the support for the grinding devices having a sprocket wheel 10 which is driven by the chain 11, see Fig. 4. The disc 12' carries a vertical pivot 19 the lower end 20 of which fits in a socket in the disc 12'. On this disc is mounted, so as to be freely rotatable, the hub 21 of the holder for the grinding device. This holder consists of a guide member 22 in which the foot 14 of the holder can be longitudinally adjusted. The grinding disc 18 is freely rotatable in relation to the part 15 of the holder. The end face of the grinding disc comes once into engagement with the fly cutter in travelling through its circular path.

The guide member 22 has a projection 23 extending from the hub 21, which projection carries at its upper end a roller 24 which is urged against the periphery of a cam 25 by a spring 26. The cam 25 is secured to the upper end of the vertical spindle 4 so that it remains stationary and does not take part in the rotation. As the vertical spindle 19 is secured to the rotary support 12' the grinding device (grinding disc) performs a circular movement, the holder for the grinding disc being controlled by the cam 25 in such manner that the grinding device with the fly cutter takes part in a supplementary movement which permits the front face of the grinding disc to bear continuously against the cutting edge of the cutter notwithstanding the shift of the cutter.

In this embodiment also, two, four or more grinding disc holders may be provided on the supporting disc 12'.

The circular movement of the grinding means permits of operation free from shock, as the hitherto known controlling means, including a reciprocating slide, rock levers or the like which produced unavoidable shocks is dispensed with.

The peripheral velocity of the rotating starlike member 12 carrying the grinding means is suited to the curved movement of the cutter and to the retreating edge of the cutter. If there is any variation in the cam movement or in the inclination of the cutting edge, only the bearing brackets 14 which carry the grinding means need be displaced in order by variation of the peripheral velocity to suit the new conditions. In order to bring the grinding discs again into the correct relation to the cutter, the whole device may be adjusted by shift of the plate 8 which extends transversely to the axis of cutter support.

As appears from consideration of the embodiment shown in Figs. 3 and 4, a high peripheral velocity can be obtained at the instant of grinding with a small diameter of star-shape support 12', by virtue of the variation of the movements of the cam 25 while by virtue of said variation of cam movement inversely a low peripheral velocity can be obtained if necessary with a large diameter star-shaped support shown in Figs. 1 and 2. The arrangement can thus be accommodated to suit widely differing conditions.

I claim:

1. In a cigarette rod-making-machine in combination with a fly cutter, a support therefor continuously rotatable in a plane, grinding means for grinding said fly cutter, means for supporting said grinding means continually rotatable along a curved orbit in a plane substantially at right angles to the plane of rotation of the fly cutter support, substantially as and for the purpose set forth.

2. In a cigarette-rod-making machine in combination with a fly cutter, said fly cutter rotatable in one plane, grinding means for grinding said fly cutter, said grinding means comprising a support with a plurality of grinding devices mounted thereon, said support being rotatable in a plane substantially at right angles to the plane of rotation of the fly cutter and said grinding devices mounted at angular intervals apart on said support substantially as and for the purpose set forth.

3. In a cigarette-rod-making machine in combination with a fly cutter, said fly cutter rotatable in one plane, grinding means for grinding said fly cutter, said grinding means comprising a support with a plurality of grinding devices mounted thereon, said support being rotatable in a plane substantially at right angles to the plane of rotation of the fly cutter and said grinding devices mounted at angular intervals apart on said support, said support adjustable as a unit in the direction towards the axis of rotation of the fly cutter and said grinding devices being adjustably mounted on the support.

4. In a cigarette-rod-making-machine in combination with a fly cutter a support therefor continuously rotatable in a plane, grinding means for grinding said fly cutter, said grinding means mounted on a holder, said holder rotatable about an axis substantially parallel to the plane of rotation of the fly cutter support and a controlling device for turning the holder about said axis during the engagement of the grinding means with the fly cutter.

5. In a cigarette rod making machine in combination with a fly cutter grinding means for grinding said fly cutter, said grinding means mounted on a holder, said holder rotatable about an axis disposed substantially parallel to the plane of rotation of the fly cutter, a controlling device for turning the holder about said axis during the engagement of the grinding means with the cutter, including an extension formed on said holder and having a follower-carrying end, and a stationary cam tracked by said follower-carrying end, said holder being mounted on a rotatable support.

6. In a cigarette rod making machine, the combination of cutting means, a support therefor continuously rotatable in a plane, sharpening means for said cutting means comprising, a support and sharpening devices mounted thereon, said support being rotatable on an axis substantially at right angles to the axis of rotation of said cutting means support 7. In a cigarette rod making machine, the combination of rotary cutting means, sharpening means for said cutting means comprising, a support, sharpening devices mounted thereon, said support being movable on an axis substantially at right angles to the axis of rotation of said cutting means, said sharpening devices being mounted at intervals on said support, said support being adjustable as a unit in the direction towards the axis of rotation of said cutting means, and said sharpening devices being adjustably mounted on said support.

8. In a cigarette rod making machine the combination of cutting means, a support therefor continuously rotatable in a plane, sharpening means for said cutting means mounted on a holder, said holder being rotatable about an axis substantially parallel to the axis of rotation of said cutting means support, and controlling means for rotating said holder about said axis during the engagement of the sharpening means with said cutting means.

9. In a cigarette rod making machine the combination of rotary cutting means, sharpening means mounted on a holder, said holder being rotatable about an axis disposed substantially parallel to the axis of rotation of said cutting means, controlling means for rotating said holder about said axis during engagement of said sharpening means with said cutting means and including an extension formed on said holder, a follower on one end of said extension and a cam for said follower, said holder being mounted on a rotatable support.

MAX PAUL ERNST HOHN.